Aug. 15, 1967 D. F. HAGEN 3,336,215
APPARATUS FOR THE PRODUCTION OF A GAS BY ELECTROLYSIS INCLUDING
PRESSURE RESPONSIVE MEANS FOR MONITORING AND CONTROLLING
SAID ELECTROLYSIS
Filed Dec. 30, 1963
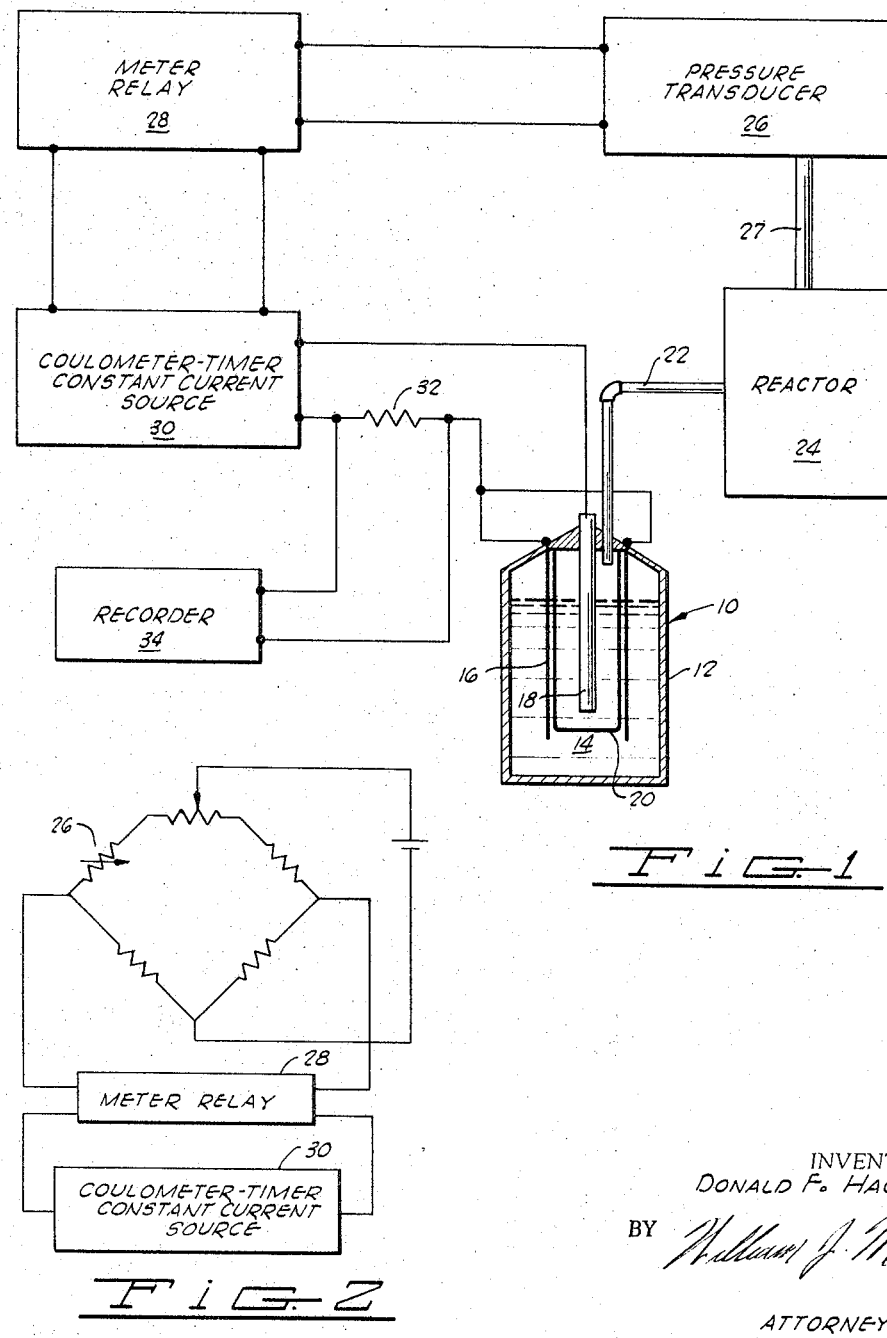
INVENTOR.
DONALD F. HAGEN
BY
ATTORNEY United States Patent Office 3,336,215
Patented Aug. 15, 1967

3,336,215
APPARATUS FOR THE PRODUCTION OF A GAS BY ELECTROLYSIS INCLUDING PRESSURE RESPONSIVE MEANS FOR MONITORING AND CONTROLLING SAID ELECTROLYSIS
Donald F. Hagen, St. Paul, Minn., assignor to Continental Oil Company, Ponca City, Okla., a corporation of Delaware
Filed Dec. 30, 1963, Ser. No. 334,273
1 Claim. (Cl. 204—230)

This invention relates to a method and apparatus for controlling the amount of a gaseous reactant supplied to a reaction zone. More particularly, but not by way of limitation, the present invention comprises a method and apparatus for automatically supplying a reactant gas to a reaction zone in order to maintain a relatively constant pressure within the reaction zone in order that the reaction may be more efficiently propagated. In another of its aspects, the invention includes means for measuring the amount of a gaseous component which is consumed in a chemical reaction involving such gaseous reactant. The invention thus affords a means for studying and evaluating the kinetics and mechanism of such reaction.

As is well known, a considerable amount of research has been recently devoted to automatically controlling various industrial processes for the purpose of lowering labor costs and, in many instances, permitting the process to be more efficiently carried out. Many of the control procedures and apparatuses which have been developed involve, as one of their aspects, a control of the length of time which a chemical reaction has proceeded. This control is established in response to a varying property or condition of one or more of the products produced in such reaction.

In some of the devices and systems which have been devised for automatically controlling the progress of chemical reactions, a pressure sensing device has been incorporated in the reaction zone. The pressure sensing means then responds to variations in the pressure in the reaction zone to increase or decrease some condition affecting the reaction, such as the temperature in the reaction zone, an electrical current supplied thereto or the amount of one or more reactants which are supplied to the reaction zone.

Although the latter types of apparatus enable the amount of personal supervision which is required in carrying out the reaction to be reduced and, in many cases, permit a closer control of the reaction to be obtained, within my knowledge, none of these systems permits, simultaneously with such control, an accurate measure to be obtained of the amount of a given reactant entering into the reaction, or the extent to which the reaction has progressed.

The present invention constitutes a method and apparatus for accurately determining the amount of a reactant gas which is consumed in a chemical reaction, and for simultaneously controlling the amount of such reactant gas supplied to a reaction zone. Broadly, the method of the invention comprises supplying a constant electrical current for the purpose of electrolytically generating one or more gases which are to be reacted with other chemicals in a reaction zone. The gas or gases thus generated are introduced to the reaction zone where they enter into the chemical reaction of interest, and simultaneously cause a positive or superatmospheric pressure to be developed in the reaction zone. As the gas or gases are consumed in the reaction, a decrease in the pressure obtaining in the reaction zone occurs and such decrease in pressure is sensed by a pressure transducer. The pressure transducer is used to vary an electrical current in accordance with the decrease in pressure in the reaction zone. The electrical current is in turn used to actuate a meter relay device in correspondence to the fluctuations in current magnitude, and the relay device in turn actuates the constant current source to recommence or increase the generation of the reactant gas. Means are provided for measuring the total amount of current which is supplied to the gas generation apparatus, and this measure of the current supplied is indicative of the amount of gas which is consumed in the reaction.

In one embodiment, the invention may also include, in combination with the elements of the apparatus hereinbefore described, a suitable recording device which may be used to provide a visual readout indicative of the amount of current being supplied to the gas generator by the constant current source, and the times over which such current is supplied.

From the foregoing summary description of the invention, it will have become apparent that it is a major object of the present invention to provide a method and apparatus for automatically controlling the progress of a chemical reaction involving one or more gaseous reactants.

A more specific object of the invention is to provide a method and apparatus for continuously and automatically controlling the supply of a gaseous reactant to a zone in which a chemical reaction involving such reactant takes place, and for simultaneously measuring the amount of such gas consumed in the reaction.

An additional object of the invention is to provide an apparatus for automatically supplying a measured amount of gas to a reaction zone in which the gas is employed as one of the reactants in a chemical reaction.

Another object of the present invention is to provide an apparatus for constantly controlling the progress of a chemical reaction involving gaseous reactants, which apparatus may be constructed of standard and well known components, and which is characterized in having a long and trouble-free operating life.

In addition to the foregoing described objects and advantages of the invention, additional objects and advantages will become apparent from the following detailed disclosure of the invention when it is considered in conjunction with the accompanying drawings.

In the drawings:

FIGURE 1 is a schematic illustration of the combined components which comprise one embodiment of the present invention.

FIGURE 2 is a wiring diagram showing the manner in which the resistance element of a pressure transducer is utilized to operate a meter relay device.

The several elements or components which, in combination, make up the apparatus of the present invention are predominantly well known and thoroughly understood in the art. These elements or components of the combination have therefore been represented by labeled rectangles which schematically portray such components. In discussing such components, reference will be made to devices which are commercially available, and which may be used in the depicted combination to achieve the objects of the invention.

In FIGURE 1 of the drawings, a device which may be used to generate a gas in response to the passage of an electrical current is indicated generally by reference character 10. In the embodiment of the invention illustrated, the gas generator 10 is an electrolytic cell 12 which contains an electrolyte 14, a cathode 16 and an anode 18. As is well understood in the art, such electrolytic cells may also include a permeable membrane 20 through which current carrying ions may pass, but which serves to divide the cell 12 into a cathode chamber and an anode chamber.

Where an electrolytic cell is employed in the apparatus of the present invention, the cell is used to generate a gaseous material in direct proportion to the amount of current passed between the cathode and anode of the cell. Apparatus of this type may be used to generate hydrogen gas, chlorine gas, oxygen and other gases in accordance with techniques and procedures well understood in the art. The gas which is liberated at the anode 18 in the cell 12 is passed through a conduit 22 to a reactor 24 in which a chemical reaction is made to occur involving the gas from the electrolytic cell 12 as one of the reactants. An example of a reaction of this type is the chlorination of unsaturated hydrocarbons by the addition of chlorine gas to points of unsaturation in such hydrocarbon molecules. Many other reactions involving gaseous components which may be electrotytically generated are well known to chemists.

The reactor 24 is completely closed or sealed so that no leakage or escape of gas therefrom can occur. In accordance with the present invention, a device is associated with the reactor 24 which can sense variations in the pressure obtaining in the reactor and convert such sensations into a useful control signal. In one embodiment of the invention, this device may be a pressure transducer 26 which possesses an electrical resistance or capacitance which varies in response to variations in the pressure in the reactor 24. The transducer 26 is placed in communication with the interior of the reactor 24 by a conduit 27.

The pressure transducer 26 which is employed may be any suitable type which can be used to convert a variation or change in gaseous pressure to a change in an electrical signal. The electrical signal is transmitted to a meter relay device 28. The pressure transducer can be the solid state type in which the resistance of the transducer changes with the change in pressure applied to the transducer. In addition to this type of transducer, pressure transducers are also available which change in electrical capacitance in response to changes in pressure. For example, a solid state, force/resistance transducer sold under the trade name "Micro-ducer" may be employed, and responds to a change in the pressure in the reactor 24 by changing in its electrical resistance.

As illustrated in FIGURE 2, the resistance element of the transducer is placed in one leg of the Wheatstone bridge circuit. The bridge circuit is connected to a suitable meter relay 28 so that unbalance of the bridge as a result of changing pressure on the transducer actuates the meter relay 28. The meter relay 28 in turn energizes a constant current source designated by the reference numeral 30. The type of meter relay which is employed in the apparatus of the invention is not critical. One suitable type is an optical meter relay of the type described in the Apr. 12, 1963, issue of Electronics Design. Other suitable types of meter relays will be well known to those skilled in the art.

The constant current source 30 which is employed in the present invention is a device capable of supplying a constant, direct current output. In a preferred embodiment of the invention, the constant current supplying device includes a coulometer-timer device which numerically indicates the total amount of current which has been delivered by the current source. It is also within the scope of the invention to use a suitable source of electrical current in combination with any device which is capable of accurately measuring the total amount of current passed from the source to the electrolytic cell 12. The output from the current source 30 is, of course, connected across the cathode 16 and anode 18 of the electrolytic cell 12.

In one embodiment of the invention, a suitable resistance 32 is placed in one of the electrical leads delivering current from the current source 30 to the electrolytic cell 12, and a potentiometric recorder 34 is placed in the circuit in parallel with the resistance 32. The recorder 34 provides a visual readout constituting a measure of the IR drop across the resistor 32, and this provides a measure of the current supplied to the electrolytic cell 12. The recorder provides further information concerning the times over which current has been delivered to the electrolytic cell 12 by the constant current source 20.

*Operation*

In the operation of the apparatus of the invention, the current source 30 is initially energized to generate a reactant gas in the electrolytic cell 12. The amount of gas generated is directly proportional to the number of coulombs of current passed through the cell. The gas evolved in the electrolytic cell 12 is passed through the conduit 22 into the reactor 24 where it is intimately contacted with other reactants and enters into a chemical reaction therewith. Introduction of the reactant gas to the reactor 24 results in a positive or superatmospheric pressure therein, and this pressure will be directly dependent upon the amount of the reactant gas which is consumed in the reaction. Thus, as the reaction proceeds, more of the reactant gas is consumed and the pressure in the reactor decreases.

Variations in the pressure in the reactor 24 result in corresponding changes in the pressure applied to the pressure transducer 26. The resistance of the transducer 26 is correspondingly caused to change so that electrical unbalance is created in the bridge circuit which contains the transducer. The unbalance of the bridge circuit is used to actuate the meter relay 28, which in turn causes the constant current source 30 to again be energized. The meter relay 28 may be set to give any desired time delay in the actuation of the constant current source 30. Thus, the effect on the reaction of various reductions in the pressure in the reactor 24 may be studied.

With the delivery of current from the constant current source 30 to the electrolytic cell 12, the generation of gas is again commenced and will continue until the pressure in the reaction zone 24 is restored to its original value. The amount of current required to effect such restoration is a direct measure of the amount of gas which has been consumed in the reaction. The coulometer provides an indication of the total quantity of current delivered so that one may be apprised of the total amount of gas which has been consumed in the reaction. The coulometer may, if desired, be calibrated directly in cubic centimeters of gas or other suitable unit of measurement of the gas consumed in the reaction.

Simultaneously with the measurement of the total quantity of current passed by the coulometer, the recorder 34 provides a visual indication of the amount of current which has passed from the constant current source 30 to the electrolytic cell 12, and of the times during which such current has been passed.

It will be apparent that the method and apparatus of the invention provide a means for constantly monitoring the progression of a chemical reaction which involves a gaseous material as one of the reactants. Moreover, the kinetics and reaction mechanism of the reaction may be studied by observing the total amount of gas consumed in the reaction, which amount is directly proportional to the amount of current delivered by the constant current source 30.

Although one embodiment of the present invention has been described in detail in order to provide an example which may be easily followed by those who desire to achieve the objects and attain the advantages of the invention, it will be understood that the structural details of the apparatus, and the precise sequence of the steps of the method may be altered to some extent without departure from the basic principles which underlie the invention. Insofar, therefore, as such modifications and innovations do not involve a departure from such basic principles, it is my intention that they be circumscribed by the spirit and scope of the invention except as the same may be necessarily limited by the appended claim or reasonable equivalents thereof.

I claim:

In combination with an apparatus for reacting a gas with another material, which apparatus includes an enclosed reaction vessel, an electrolytic cell electrolytically producing an amount of gas which is directly proportional to the amount of current passed through said cell; a constant electrical current source connected to said electrolytic cell; a coulometer-timer operatively connected to said constant current source; means for measuring the total electrical current delivered to said electrolytic cell by said source of constant electrical current, said means comprising a resistor located within the connection between the coulometer-timer and the electrolytic cell and a recorder in parallel with said resistor for recording the amount of current flowing from the constant current source of the electrolytic cell; a Wheatstone bridge having a variable resistance in one arm thereof operatively connected with said reaction vessel for sensing variations in the pressure obtaining in said reaction vessel; and a meter relay responsive to the output from said Wheatstone bridge for energizing and de-energizing said source of constant electrical current when the variable resistance in said Wheatstone bridge senses a change in the pressure obtaining in said reaction vessel.

References Cited

UNITED STATES PATENTS

| | | | |
|---|---|---|---|
| 2,744,061 | 5/1956 | De Ford et al. | 204—195 |
| 2,922,285 | 1/1960 | Rae | 204—129 |
| 2,927,888 | 3/1960 | Beard | 204—195 |
| 3,042,059 | 7/1962 | Arenhold | 137—89 |
| 3,045,665 | 7/1962 | Moyat | 204—129 |

JOHN H. MACK, *Primary Examiner.*

R. K. MIHALEK, *Assistant Examiner.*